United States Patent
Arman et al.

(10) Patent No.: US 6,330,811 B1
(45) Date of Patent: Dec. 18, 2001

(54) COMPRESSION SYSTEM FOR CRYOGENIC REFRIGERATION WITH MULTICOMPONENT REFRIGERANT

(75) Inventors: Bayram Arman; Dante Patrick Bonaquist, both of Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/606,088

(22) Filed: Jun. 29, 2000

(51) Int. Cl.[7] .................................................. F25J 1/02
(52) U.S. Cl. .................................................. 62/643; 62/84
(58) Field of Search .................... 62/643, 468, 470, 62/84, 912; 252/68

(56) References Cited

U.S. PATENT DOCUMENTS

| | | | |
|---|---|---|---|
| 5,337,572 | 8/1994 | Longsworth | 62/51.2 |
| 5,355,695 | 10/1994 | Kawaguchi et al. | 62/498 |
| 5,441,658 | 8/1995 | Boyarsky et al. | 252/67 |
| 5,452,585 | 9/1995 | Pincus et al. | 62/84 |
| 5,531,080 | 7/1996 | Hirahara et al. | 62/470 |
| 5,602,086 * | 2/1997 | Le et al. | 508/591 |
| 5,706,663 | 1/1998 | Boiarski et al. | 62/114 |
| 5,724,832 | 3/1998 | Little et al. | 62/613 |
| 5,728,655 | 3/1998 | Muraki et al. | 508/304 |
| 5,806,336 | 9/1998 | Sunaga et al. | 62/469 |
| 5,866,030 * | 2/1999 | Reyes-Gavilan et al. | 252/68 |
| 5,953,934 | 9/1999 | Makino et al. | 62/470 |
| 5,970,722 * | 10/1999 | Shibata et al. | 62/84 |
| 6,041,620 | 3/2000 | Olszewski et al. | 62/612 |
| 6,041,621 | 3/2000 | Olszewski et al. | 62/613 |
| 6,053,008 | 4/2000 | Arman et al. | 62/646 |
| 6,176,102 * | 1/2001 | Novak et al. | 62/612 |

* cited by examiner

*Primary Examiner*—William Doerrler
*Assistant Examiner*—Malik N. Drake
(74) *Attorney, Agent, or Firm*—Stanley Ktorides

(57) ABSTRACT

A system for generating refrigeration wherein a multicomponent refrigerant is compressed in a compressor lubricated with polyalphaolefin-based oil, the oil is removed from the compressed refrigerant, and the compressed refrigerant is expanded to generate refrigeration at a cryogenic temperature for provision to a refrigeration receptor.

10 Claims, 1 Drawing Sheet

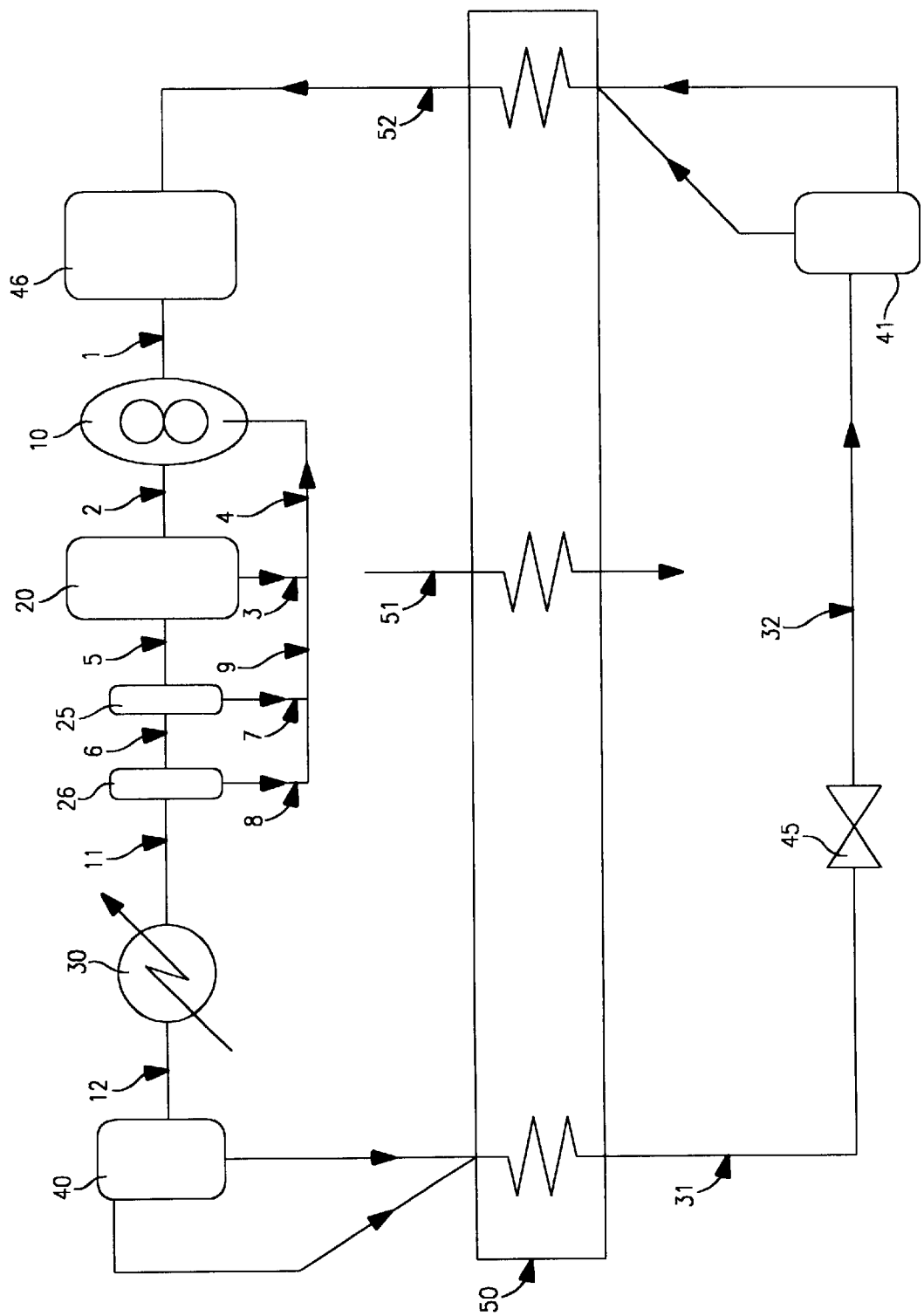

COMPRESSION SYSTEM FOR CRYOGENIC REFRIGERATION WITH MULTICOMPONENT REFRIGERANT

TECHNICAL FIELD

This invention relates generally to the provision of refrigeration and, more particularly, to the provision of refrigeration at a cryogenic temperature.

BACKGROUND ART

In a typical refrigeration system, a refrigerant fluid such as R-12, R-134a or other freon type refrigerant, is compressed, expanded to generate refrigeration, and then warmed whereby refrigeration is passed from the refrigerant to a refrigeration receiver. The warmed refrigerant is then returned to the compressor and the refrigeration cycle repeats.

The compressor used in the refrigeration cycle is typically oil lubricated and some of this lubricant leaves the compressor with the compressed refrigerant. It is generally good practice to use a lubricating oil, such as a polyolester-based oil, which is highly soluble with the refrigerant. In this way substantially all of the lubricating oil which leaves the compressor with the compressed refrigerant is returned to the compressor with the recycled warmed refrigerant. If a significant amount of the lubricating oil which left the compressor were to remain in the refrigeration circuit and not be returned to the compressor, there may be inadequate lubricating oil in the compressor causing loss of compressor efficiency and perhaps even leading to compressor failure.

Very low temperature or cryogenic refrigeration is becoming increasingly important, such as for use in such fields as energy generation, energy transmission and electronics. Any improvement in refrigeration systems which would enhance the ability to generate and provide refrigeration at a cryogenic temperature would be very desirable.

Accordingly, it is an object of this invention to provide an improved system for generating and providing refrigeration at a cryogenic temperature.

SUMMARY OF THE INVENTION

The above and other objects, which will become apparent to those skilled in the art upon a reading of this disclosure, are attained by the present invention one aspect of which is:

In a method for providing refrigeration wherein a refrigerant fluid is compressed, expanded to generate refrigeration, and then warmed to provide refrigeration to a refrigeration receptor, the improvement comprising:

(A) employing a multicomponent refrigerant as the refrigerant fluid;

(B) compressing the multicomponent refrigerant using a compressor which is lubricated using a polyalphaolefin-based oil; and (C) providing the refrigeration at a temperature less than 220K.

Another aspect of the invention is:

Apparatus for providing refrigeration comprising:

(A) an oil-lubricated compressor, an oil separation system, means for passing multicomponent refrigerant from the compressor to the oil separation system, and means for passing lubricating oil from the oil separation system to the compressor;

(B) an expansion device, a heat exchanger, means for passing multicomponent refrigerant from the oil separation system to the expansion device, from the expansion device to the heat exchanger, and from the heat exchanger to the compressor; and (C) means for providing a refrigeration receptor to the heat exchanger whereby refrigeration is provided from the multicomponent refrigerant to the refrigeration receptor.

As used herein the term "indirect heat exchange" means the bringing of two fluids into heat exchange relation without any physical contact or intermixing of the fluids with each other.

As used herein the term "expansion" means to effect a reduction in pressure.

As used herein the term "variable load refrigerant" means a multicomponent refrigerant, i.e. a mixture of two or more components, in proportions such that the liquid phase of those components undergoes a continuous and increasing temperature change between the bubble point and the dew point of the mixture. The bubble point of the mixture is the temperature, at a given pressure wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the multicomponent refrigerant fluid is generally at least 10° C., preferably at least 20° C. and most preferably at least 50° C.

As used herein the term "atmospheric gas" means one of the following: nitrogen ($N_2$), argon (Ar), krypton (Kr), xenon (Xe), neon (Ne), carbon dioxide ($CO_2$), nitrous oxide ($N_2O$), oxygen ($O_2$) and helium (He).

As used herein the term "compressor" means a device which increases the pressure of a gas.

As used herein the term "lubricated" means characteristic of a device wherein a substance capable of reducing friction, heat and wear is introduced as a film between solid surfaces of the device.

As used herein the term "polyalphaolefin" means a linear alpha-olefin having six or more carbon atoms.

As used herein the term "polyalphaolefin-based oil" means an oil formulation using one or more polyalphaolefin species in its base stock.

As used herein the term "miscible" means soluble if referring to the interaction of vapor and liquid phases, and means miscible if referring to the interaction of two liquids.

As used herein the term "miscibility" means solubility if referring to the interaction of vapor and liquid phases, and means miscibility if referring to the interaction of two liquids.

BRIEF DESCRIPTION OF THE DRAWING

The sole FIGURE is a simplified schematic representation of one preferred arrangment wherein the invention may be practiced.

DETAILED DESCRIPTION

In general the invention comprises the use of a multicomponent refrigerant to generate refrigeration at a cryogenic temperature, i.e. a temperature less than 220K, and the use of a compressor for compressing this refrigerant which is lubricated with a polyalphaolefin-based oil. This oil has very low miscibility with the refrigerant so that essentially all of the lubricating oil which leaves the compressor with the compressed refrigerant can be separated with relative ease from the refrigerant before the refrigerant enters the cryogenic temperature segment of the refrigeration cycle. In this way, freezing of the lubricating oil within the refrigeration cycle, which would otherwise occur if the lubricating oil were mixed with the refrigerant, is avoided. The lubricating oil which is separated from the multicomponent refrigerant upstream of the cryogenic temperature segment is returned to the compressor separately from the refrigerant.

Limited refrigerant miscibility (low liquid phase miscibility usually corresponds to low solubility between vapor and liquid) with lubricant also promotes higher performance of screw compressors because the limited refrigerant solubility in oil will eliminate refrigerant bypass from the discharge to suction. In addition, bypassing of refrigerant via circulation with oil will be reduced or eliminated. It is also very desirable to have no oil in the heat exchangers so that the heat transfer performance does not deteriorate with time. There are basically two mechanisms by which oil could be carried over: (1) as small aerosol droplets and (2) as vapor due to its vapor pressure. The preferred lubricant has almost no vapor pressure so that there is no significant amount of lubricant in the refrigerant vapor. The preferred lubricant has a very high purity, i.e. has very few impurities and in small amounts.

The invention will be described in greater detail with reference to the Drawing. Referring now to the FIGURE, multicomponent refrigerant fluid 1 is passed to compressor 10 wherein it is compressed to a pressure generally within the range of from 50 to 1000 pounds per square inch absolute (psia). Multicomponent refrigerant 1 preferably comprises at least two components from the group consisting of fluorocarbons, hydrofluorocarbons, hydrochlorofluorocarbons, fluoroethers, hydrofluoroethers, atmospheric gases and hydrocarbons. Preferably the multicomponent refrigerant useful in the practice of this invention is a variable load refrigerant.

The multicomponent refrigerant useful with this invention preferably comprises at least one component from the group consisting of fluorocarbons, hydrofluorocarbons, fluoroethers and hydrofluoroethers, and at least one component from the group consisting of fluorocarbons, hydrofluorocarbons, hydrochlorofluorocarbons, fluoroethers, hydrofluoroethers, atmospheric gases and hydrocarbons.

Another preferred multicomponent refrigerant useful with this invention comprises at least two components from the group consisting of fluorocarbons, hydrofluorocarbons, fluoroethers and hydrofluoroethers and at least one component from the group consisting of fluorocarbons, hydrofluorocarbons, hydrochlorofluorocarbons, fluoroethers, hydrofluoroethers, atmospheric gases and hydrocarbons.

Another preferred multicomponent refrigerant useful with this invention comprises at least one fluorocarbon and at least one component from the group consisting of hydrofluorocarbons and atmospheric gases.

Another preferred multicomponent refrigerant useful with this invention comprises at least one hydrofluorocarbon and at least one atmospheric gas.

Another preferred multicomponent refrigerant useful with this invention comprises at least three components from the group consisting of fluorocarbons, hydrofluorocarbons, fluoroethers and hydrofluoroethers, and at least one component from the group consisting of fluorocarbons, hydrofluorocarbons, hydrochlorofluorocarbons, fluoroethers, hydrofluoroethers, hydrocarbons and atmospheric gases.

Another preferred multicomponent refrigerant useful with this invention comprises at least two components from the group consisting of fluorocarbons, hydrofluorocarbons, fluoroethers and hydrofluoroethers, and at least one atmospheric gas.

Another preferred multicomponent refrigerant useful with this invention comprises at least two components from the group consisting of fluorocarbons, hydrofluorocarbons, fluoroethers and hydrofluoroethers, at least one atmospheric gas, and at least one component from the group consisting of fluorocarbons, hydrofluorocarbons, hydrochlorofluorocarbons, fluoroethers, hydrofluoroethers, hydrocarbons and atmospheric gases.

Another preferred multicomponent refrigerant useful with this invention comprises at least two components from the group consisting of fluorocarbons, hydrofluorocarbons, fluoroethers and hydrofluoroethers, and at least two atmospheric gases.

Another preferred multicomponent refrigerant useful with this invention includes at least one fluoroether, i.e. comprises at least one fluoroether, and at least one component from the group consisting of fluorocarbons, hydrofluorocarbons, fluoroethers, hydrofluoroethers, hydrochlorofluorocarbons, hydrocarbons and atmospheric gases.

In one preferred embodiment of the invention the multicomponent refrigerant consists solely of fluorocarbons. In another preferred embodiment of the invention the multicomponent refrigerant consists solely of fluorocarbons and hydrofluorocarbons. In another preferred embodiment of the invention the multicomponent refrigerant consists solely of fluoroethers. In another preferred embodiment of the invention the multicomponent refrigerant consists solely of fluoroethers and hydrofluoroethers. In another preferred embodiment of the invention the multicomponent refrigerant consists solely of fluorocarbons, hydrofluorocarbons, fluoroethers and hydrofluoroethers. In another preferred embodiment of the invention the multicomponent refrigerant consists solely of fluorocarbons, fluoroethers and atmospheric gases. Most preferably every component of the multicomponent refrigerant is either a fluorocarbon, hydrofluorocarbon, fluoroether, hydrofluoroether or atmospheric gas.

A particularly preferred multicomponent refrigerant for use in the practice of this invention comprises about 12 mole percent dichlorotrifluoroethane, about 36 mole percent pentafluoroethane, about 39 mole percent tetrafluoromethane and about 13 mole percent nitrogen.

Generally it is preferred that the multicomponent refrigerant useful in the practice of this invention include one or more components from the group consisting of dichlorotrifluoroethane, pentafluoroethane, tetrafluoromethane, nitrogen, perfluorobutoxy-methane, decafluoropentane, dichloropentafluoropropane, perfluoropropoxy-methane, dichlorofluoroethane, pentafluoropropane, hexafluoropropane, hexafluorobutane, pentafluorobutane, tetrafluoroethane, ammonia, pentafluoroethane, perfluoropropane, perfluorobutane, perfluoropentane, perfluorohexane, difluoromethane, perfluoroethane, trifluoromethane, tetrafluoromethane, chlorotetrafluoroethane, argon, neon, helium, carbon dioxide and nitrous oxide.

Compressor 10 is lubricated with a polyalphaolefin-based oil. Preferred polyolefins for use in the practice of this invention have the formula $C_nH_{2n+2}$ where n can be from 10 to 120. Examples include $C_{20}H_{42}$, $C_{30}H_{62}$, $C_4H_{82}$, $C_{50}H_{102}$, $C_{60}H_{122}$ and $C_{70}H_{142}$.

Solubility of a gas is a function of temperature, pressure, dipole moment and the nature of the interaction between the solvent and the solute. The solubility of a gas may be increased if there is a Lewis acid-base interaction, a specific chemical interaction between quadrupole moments, or a hydrogen bonding. The solubility also increases with the liquid phase miscibility. A polyalphaolefin is a straight chain saturated hydrocarbon that is non-polar and generally has a neutral acidity. The components of the preferred refrigerant mixtures are also non-polar or exhibit low polarity. Their solubility will not be enhanced due to solute-solvent interactions; as a result, concentration of these components in the oil phase will be very small, typically smaller than one percent and may be less than 300 ppm. Having low or no concentration of refrigerants in the oil (1) minimizes oil mist formation of the compressor discharge, (2) allows larger oil droplet formation at the compressor discharge, (3) enables better mechanical separation due to larger aerosol sizes, and (4) increases the coalescence rate of droplets because the droplets do not break up.

The components of the multicomponent refrigerant and the particular polyalphaolefin(s) used in the lubricating oil are chosen so that the miscibility of the oil in the refrigerant does not exceed one percent, and preferably does not exceed 500 ppm.

The multicomponent refrigerant and the lubricating oil are compressed together in oil-flooded compressor 10 and leave compressor 10 as compressed refrigerant-oil fluid 2 which comprises generally from about 10 to 20 weight percent oil. Refrigerant-oil fluid 2 is passed into bulk oil separator 20 which is preferably a gravitational settling tank or a cyclone type separator. Within separator 20, owing to the very low miscibility of the oil in the refrigerant., most of the oil in refrigerant-oil fluid 2 is separated from the fluid, passed out of separator 20 in stream 3, and directed back to compressor 10 in lubricating oil recycle stream 4.

Oil-depleted refrigerant fluid stream 5, generally comprising from about 0.01 to 5 weight percent, typically about 1 weight percent lubricating oil, is passed from separator 20 to coarse coalescing filter 25 wherein the oil content is decreased to be within the range of from 50 to 100000 parts per billion (ppb), generally about 7500 ppb, and from there is passed in stream 6 to fine coalescing filter 26 wherein the oil content is decreased to be less than 5 ppb. Mechanical coalescing filters 25 and 26 operate by taking aerosol oil particles and settling them to form larger oil droplets within a filter element. Since the oil has a higher density than that of the multicomponent refrigerant which at this stage is in the vapor phase, the oil gravitates downward as the oil droplets increase in size. The oil droplets are separated from the multicomponent refrigerant vapor and returned to the compressor. In the embodiment of the invention illustrated in the Drawing, lubricating oil is withdrawn from coalescing filter system 25 in stream 7 and from coalescing filter system 26 in stream 8 and combined to form stream 9 which is passed into recycle stream 4 for return to compressor 10. The lubricating oil can be returned to the compressor via an internal float valve assembly. Other methods for returning the oil include using a fixed orifice or capture between the oil outlet connection and the compressor crankcase. The oil return can be electronically controlled with a solenoid valve and timer or a solenoid valve and level switch. If desired, one or more additional coalescing filters may be used in order to further reduce the oil content of the multicomponent refrigerant fluid although each additional filter which is used increases the pressure drop of the system.

Multicomponent refrigerant vapor containing substantially no oil is passed in stream 11 to aftercooler 30 wherein it is cooled of the heat of compression by indirect heat exchange with cooling fluid to form compressed multicomponent refrigerant stream 12. If there is some condensation in stream 12 it is passed to vapor liquid separator 40. The two phase stream 12 is separated into liquid and vapor portions which are usually introduced to the heat exchanger using separate headers to promote uniform distribution across different tubes or passages. In some heat exchanger configurations and operating conditions, the separator 40 may not be necessary and stream 12 may be passed directly into heat exchanger 50.

Multicomponent refrigerant is provided to heat exchanger 50 wherein it is cooled by indirect heat exchange with warming multicomponent refrigerant, as will be further discussed below, to produce cooled multicomponent refrigerant in steam 31, generally having a temperature within the range of from 250K to 80K. Multicomponent refrigerant 31 is then passed to an expansion device, such as Joule-Thomson expansion valve 45, wherein it is expanded to generate refrigeration, resulting in refrigeration bearing multicomponent refrigerant stream 32 having a pressure generally within the range of from 10 to 200 psia, and having a temperature less than 220K and generally within the range of from 80 to about 220K. If the expansion of stream 31 results in condensation of some of that stream, stream 32 may be processed in vapor-liquid separator 41 as illustrated in the Drawing.

Refrigeration bearing multicomponent refrigerant at a cryogenic temperature is passed to heat exchanger 50 wherein it is warmed to effect the cooling of the multicomponent refrigerant as was previously described, and also to provide refrigeration to a refrigeration receptor. In the embodiment of the invention illustrated in the Drawing, the refrigeration receptor is fluid in stream 51 which is cooled, liquefied and/or subcooled by indirect heat exchange with the warming multicomponent refrigerant. The providing of the refrigeration from the multicomponent refrigerant to the refrigeration receptor could be by use of the same heat exchanger as is used to cool the multicomponent refrigerant prior to its expansion, as illustrated in the Drawing, or could be by use of a different heat exchanger means. Other refrigeration receptors which could receive refrigeration from the warming multicomponent refrigerant include the atmosphere of a refrigerator or freezer system, and solid structures such as walls or shelves.

The resulting warmed multicomponent refrigerant exiting heat exchanger 50 is passed in stream 52 to surge tank 46 which ensures that no liquid enters the compressor, and from surge tank 46 is passed as stream 1 into compressor 10 and the refrigeration cycle starts anew.

Although the invention has been described in detail with reference to a certain preferred embodiment, those skilled in the art will recognize that there are other embodiments of the invention within the spirit and the scope of the claims.

What is claimed is:

1. In a method for providing refrigeration wherein a refrigerant fluid is compressed, expanded to generate refrigeration, and then warmed to provide refrigeration to a refrigeration receptor, the improvement comprising:

(A) employing a multicomponent refrigerant as the refrigerant fluid;

(B) compressing the multicomponent refrigerant using a compressor which is lubricated using a polyalphaolefin-based oil; and (C) providing the refrigeration at a temperature less than 220K, and wherein polyalphaolefin-based oil is separated from the compressed multicomponent refrigerant before the multicomponent refrigerant is expanded, and the separated oil is then passed to the compressor.

2. The method of claim 1 wherein the multicomponent refrigerant comprises at least two components from the group consisting of fluorocarbons, hydrofluorocarbons, hydrochlorofluorocarbons, fluoroethers, hydrofluoroethers, atmospheric gases and hydrocarbons.

3. The method of claim 2 wherein the multicomponent refrigerant consists solely of fluorocarbons.

4. The method of claim 2 wherein the multicomponent refrigerant consists solely of hydrofluoroethers.

5. The method of claim 1 wherein the multicomponent refrigerant includes at least one atmospheric gas.

6. In a method for providing refrigeration wherein a refrigerant fluid is compressed, expanded to generate refrigeration, and then warmed to provide refrigeration to a refrigeration receptor, the improvement comprising:

(A) employing a multicomponent refrigerant as the refrigerant fluid;

(B) compressing the multicomponent refrigerant using a compressor which is lubricated using a polyalphaolefin-based oil; and (C) providing the refrigeration at a temperature less than 220K, and wherein the warming multicomponent refrigerant also provides refrigeration to cool the compressed multicomponent refrigerant prior to the expansion of the multicomponent refrigerant.

7. The method of claim 6 wherein the multicomponent refrigerant comprises at least two components from the group consisting of fluorocarbons, hydrofluorocarbons, hydrochlorofluorocarbons, fluoroethers, hydrofluoroethers, atmospheric gases and hydrocarbons.

8. The method of claim 7 wherein the multicomponent refrigerant consists solely of fluorocarbons.

9. The method of claim 7 wherein the multicomponent refrigerant consists solely of hydrofluoroethers.

10. The method of claim 6 wherein the multicomponent refrigerant includes at least one atmospheric gas.

* * * * *